United States Patent [19]

Würmli et al.

[11] 3,945,792

[45] Mar. 23, 1976

[54] PROCESS FOR THE FILLING OF LEATHER AND COMPOSITIONS THEREFOR

[75] Inventors: Albert Würmli; Hubert Wachsmann, both of Riehen, Switzerland

[73] Assignee: Ciba-Geigy Corporation, Ardsley, N.Y.

[22] Filed: Feb. 28, 1973

[21] Appl. No.: 336,571

Related U.S. Application Data

[63] Continuation-in-part of Ser. No. 47,618, June 18, 1970, abandoned.

[30] Foreign Application Priority Data

July 9, 1969 Switzerland.................... 10455/69

[52] U.S. Cl................. 8/94.21; 8/94.1 R; 8/94.32; 8/94.33; 252/8.57
[51] Int. Cl.$^2$......................................... C14C 11/00
[58] Field of Search ..... 8/94.1, 94.21, 94.32, 94.33; 252/8.57

[56] References Cited
UNITED STATES PATENTS

| | | | |
|---|---|---|---|
| 171,753 | 1/1876 | Adams................................. | 8/94.21 |
| 1,345,430 | 7/1920 | Zdanowski........................... | 8/94.21 |
| 1,378,213 | 5/1921 | Brant et al........................... | 8/94.21 |
| 1,962,444 | 6/1934 | Hesselberger....................... | 8/94.21 |
| 2,015,864 | 10/1935 | Muller et al. .......................... | 91/68 |
| 2,220,867 | 11/1940 | Kirk....................................... | 8/94.2 |
| 2,452,536 | 11/1948 | Kirk...................................... | 8/94.21 |

FOREIGN PATENTS OR APPLICATIONS

| | | | |
|---|---|---|---|
| 795,711 | 5/1958 | United Kingdom............... | 96/94.21 |

OTHER PUBLICATIONS

"Resin Dispersion for Sealing and Finishing Leather," F.I.A.T. (B.I.O.S.), Final Report No. 1108, 1947, p. 178.

*Primary Examiner*—Benjamin R. Padgett
*Assistant Examiner*—B. Hunt
*Attorney, Agent, or Firm*—Joseph G. Kolodny; Edward McC. Roberts; Prabodh I. Almaula

[57] ABSTRACT

A process for the filling of leather tanned with mineral, vegetable and/or synthetic tanning agents by treating the leather, in the acid pH-range , with an aqueous solution of a filling agent consisting of unsubstituted or substituted homo- or copolymeric acrylic acids and protein glue, alone or in admixture with further additives, as well as dry or liquid compositions thereof, are disclosed; thereby an even fullness of the leather is obtained without impairing the handle, the buffing properties, the tightness of the grain, the fine grain or the dyeability of said leathers.

9 Claims, No Drawings

PROCESS FOR THE FILLING OF LEATHER AND COMPOSITIONS THEREFOR

This application is a continuation-in-part of application Ser. No. 47,618, filed June 18, 1970, now abandoned.

The present invention relates to a process for the filling of leather tanned with mineral, vegetable and/or synthetic tanning agents, to compositions usable therefor as well as to the leather obtained by the process according to the invention.

It is known that leather tanned with mineral, vegetable and/or synthetic tanning agents, can be advantageously given an after-treatment for the purpose of improving the fullness, the handle and/or the buffing property, whereby, depending on the nature of the preliminary tanning, vegetable, synthetic or resinous tanning substances can be used for the purpose. Leather after-treated in such a manner, however, has certain disadvantages in that, for example, the tightness and smoothness of grain are unfavourably affected and, in particular, the dyeability of the leather is impaired. The use, as a tanning agent for leather, of acid polymers containing carboxyl groups, has, moreover, also been already suggested, but leather treated therewith exhibits, in many cases, an inadequate fullness and dyestuff absorption.

Surprisingly, it has now been found that an even fullness can be imparted to leather tanned with mineral, vegetable and/or synthetic tanning agents, without impairing the handle, the buffing property, the tightness of grain, the fine grain or the dyeability of the leather, by treating the leather, in the acid pH range, with an aqueous solution of a filling agent consisting of unsubstituted or substituted homo- or copolymeric acrylic acids and protein glue in a weight ratio of homo- or copolymeric acrylic acids to glue of approximately 1:12 to 12:1, alone or in admixture with further additives.

The aqueous solutions usable according to the invention can be so-called true as well as colloidal solutions.

Particularly favourable results, with regard to filling and dyeability of the leather, are obtained if the process according to the invention is performed with a pH-value of the solution of between 3 and 5.

The unsubstituted or substituted homo- or copolymeric acrylic acids according to the invention are water-soluble and are advantageously used in the form of their alkali metal salts, especially the sodium and potassium salts, or in the form of their ammonium salts, alone or in admixture with corresponding free polycarboxylic acids.

Preferable for use in the process according to the invention are water-soluble, unsubstituted or substituted homopolymeric acrylic acids, e.g. homopolymers from the following monomers: acrylic acid, methacrylic acid, α-ethylacrylic acid, α-isopropylacrylic acid, α-butyacrylic acid and α-chloroacrylic acid. Especially preferred are water-soluble homopolymers of acrylic or methacrylic acid.

Suitable copolymeric acrylic acids usable according to the invention are, in particular, copolymerisation products of acrylic acid and methacrylic acid, but also copolymerisation products of acrylic acid or methacrylic acid with an above-mentioned substituted acrylic acid.

Further copolymerisation products usable according to the invention are obtained by copolymerisation of acrylic or methacrylic acid with compounds containing vinyl groups and capable of copolymerisation, especially water-soluble or water-insoluble comonomers.

Examples of water-soluble comonomers are:

a. comonomers containing carboxylic acid groups, such as crotonic acid;

b. comonomers containing carboxylic acid amide groups, and their N-hydroxyalkyl derivatives such as acrylic acid amide, methacrylic acid amide, N-hydroxymethyl-, N-β-hydroxyethyl-, N-γ-hydroxypropyl-, N,N-bis-β-hydroxyethyl acrylic acid amide, N-hydroxymethyl-, N-β-hydroxyethyl-, N-γ-hydroxypropyl- and N,N-bis-β-hydroxyethyl methacrylic acid amide;

c. water-soluble derivatives of β-hydroxyalkyl acrylic acid amides or -methacrylic acid amides, which are obtained, e.g. by condensation of acrylic acid halides or methacrylic acid halides, particularly chlorides, with reaction products from alkanolamines and chlorosulphonic acid;

d. aldehydes capable of copolymerisation, such as acrolein and croton aldehyde.

Examples of suitable water-insoluble comonomers are:

i. acrylic acid alkyl esters or methacrylic acid alkyl esters having from 1 to 12 carbon atoms in the alkyl radical which, optionally, can be further substituted, particularly by hydroxyl groups, such as acrylic acid methyl ester or methacrylic acid methyl ester, ethyl ester, β-hydroxyethyl ester, n.-butyl ester and dodecyl ester;

ii. vinyl esters of aliphatic carboxylic acids containing from 1 to 12 carbon atoms, or of mixtures of such carboxylic acids such as vinyl acetate, vinyl formate, vinyl butyrate or vinyl ester of the carboxylic acid mixture having 9 to 11 carbon atoms, known under the trade-name of VEOVA 911 (Shell) (also called "versatinic acid" vinyl ester);

iii. vinyl benzenes such as styrene, chlorostyrene, methylstyrene.

Among the copolymerisation products from acrylic or methacrylic acids and the above-mentioned water-insoluble comonomers those having a major portion of acrylic or methacrylic acids are preferred.

The mono- or copolymerisation can be performed, in a manner known per se, in aqueous or aqueous-organic, such as aqueous-alcoholic, solution or suspension under the effect of catalysts, preferably radical-forming catalysts such as hydrogen peroxide, ammonium persulphate, potassium persulphate or organic peroxides, e.g. dibenzoyl peroxide, or with the use of ammonium persulphate and sodium hydrogen sulphite. Optionally, the mono- or copolymerisation is carried out in the presence of usual emulsifiers, especially anion-active emulsifiers, such as sulphated higher alcohols, e.g. stearylsulphate or oleylsulphate, or sulphated ethhyleneoxide addition products, particularly sulphated addition products of from 1 to 30 mols of ethyleneoxide and fatty acids or aliphatic alcohols, for instance lauryl-, stearyl- or oleyl-alcoholpolyglycol ether sulphates having about 20 ethyleneoxy groups. The mono- or copolymerisation is advantageously carried out at a temperature between 40° and 100°C.

By protein glue usable according to the invention is meant water-soluble glue produced from animal raw materials containing collagen and which contains animal protein as principal constituent. The animal protein glue may be used in any chosen form, e.g. in the form of small pieces, in the ground or liquid state, as gel, or also in the form of gelatin. In this specification and the appended claims whenever protein glue is mentioned, animal protein glue is meant.

The aqueous solutions usable in the process according to the invention can be prepared, e.g. from concentrated, liquid, water-soluble compositions as well as from pulverised dry filling agents as defined. Therefore, the present invention also relates to such concentrated, liquid, water-soluble compositions and pulverised dry filling agents, respectively. Preferably, concentrated, liquid, water-soluble compositions are used which, calculated on the total weight of the composition, contain as essential components a. from 0 to 30 per cent by weight of tanning agent,
b. from 5 to 40 per cent by weight, especially from 10 to 30 per cent by weight, of filling agent consisting of unsubstituted or substituted homo- or copolymeric acrylic acids and protein glue in a weight ratio of homo- or copolymeric acrylic acids to glue of from 1:12 to 12:1, the balance consisting of
c. water, whereby the composition has a pH of at least 4.0. Such concentrated compositions according to the invention are preferably prepared by dissolving the homo- or copolymeric acrylic acids and the protein glue, in the desired proportions, separately in water, and subsequently combining the two solutions with vigorous stirring, optionally with the addition of tanning agents. In order to obtain the desired pH-value of at least 4.0 and preferably from 5.0 to 7.0, usual neutralising agents are added, if necessary, such as sodium hydroxide, ammonium or basic amines, e.g. dimethylamine or trimethylolamine. Advantageously these neutralising agents are added to the aqueous homo- or copolymeric acrylic acid solution. The concentrated, liquid, water-soluble compositions obtained in this manner, after dilution with water and vigorous stirring, can be used directly in the process according to the invention.

Stable, storable pulverised dry filling agents according to the invention, which essentially consist of unsubstituted or substituted homo- or copolymeric acrylic acids and protein glue in a weight ratio of homo- or copolymeric acrylic acids to glue of from 1:12 to 12:1, alone or in admixture with further additives, can be prepared, for example, by evaporating to dryness, e.g. in vacuo, the combined solutions of protein glue and optionally neutralised homo- or copolymeric acrylic acids, in the desired proportions, and pulverising and optionally admixing the powder obtained with further additives in solid form as defined hereinafter. However, it is also possible to add the further additives in liquid form to the solutions of protein glue and homo- or copolymeric acrylic acids, whereupon the obtained aqueous composition is evaporated to dryness. Such pulverised dry filling agents can be dissolved in water with vigorous stirring whenever desired, and the aqueous solutions thus obtained can be employed directly for the filling of leather according to the process of this invention.

The homo- or copolymeric acrylic acid and the protein glue are preferably used in a reciprocal weight ratio of approximately 1:1 to 1:6, especially 1:4.

Here and in the following, percentages and amounts given — if not otherwise stated — relate to the shaved weight of the leather to be treated.

Particularly favourable results are obtained by using in the process according to the invention an aqueous solution containing, in all, from 0.1 to 10 per cent by weight of the filling agent consisting of homo- or copolymeric acrylic acids and protein glue (dry substance relative to shaved weight of the leather).

As further additives the aqueous solutions usable according to the invention or the concentrated, liquid, water-soluble compositions and pulverised dry filling agents of this invention, respectively, from which said solutions can be prepared, can contain, in particular, tanning agents, e.g. vegetable tanning extracts, synthetic tanning substances, resinous tanning agents or dialdehydes such as glutaraldehyde. Advantageously, these tanning agents are added to the concentrated liquid compositions or pulverised dry filling agents in such amounts that the directly usable, aqueous solutions obtained therefrom, depending on whether the tanning agents are used in the dry or liquid form, contain from about 2 to 10 per cent by weight or from 5 to 15 per cent by weight, respectively, of said tanning agents, relative to the shaved weight.

To the aqueous solution usable in the process according to the invention may also be added inorganic acids, and especially organic acids such as acetic and formic acid, or acid-reacting auxiliary tanning agents such as condensation products from naphthalene sulphonic acids and formaldehyde, or salts splitting off acid and having a tanning action such as chromium, aluminum and zirconium sulphates, preferably in such an amount that the leather exhibits, at the end of the after-treatment, a pH-value of 3.5 to 5.5.

Finally, usual fat-liquoring agents can be added to the aqueous solution usable according to the invention, advantageously fat-liquoring agents containing cationic constituents, or after a usual fat-liquoring a cationic fat-topping is applied.

Advantageously, the above-mentioned additives are added to the treatment bath during the course of the treatment and not immediately at the beginning.

Suitable leather to be treated according to the invention is, in particular, mineral-tanned leather, especially chrome-tanned leather such as chrome-tanned side leather, calf leather, kid leather or sheepskin leather, but also vegetable-tanned leather, particularly vegetable-tanned sheepskin and kid leather.

The filling, according to the invention, of the leather is preferably carried out in a drum or paddle. It is advisable, before the actual treatment, to slightly neutralise the tanned leather, still moist from shaving, in the usual manner by treating it in an aqueous bath (ratio of leather moist from shaving to liquor = approximately 1:2 to 1:3 in the drum) during 30 to 90 minutes, depending on the thickness of the leather, at a bath temperature of about 30° to 35°C with e.g. 0.5 to 2 per cent by weight of one or more of the usual neutralising agents, such as sodium bicarbonate and sodium formate, whereafter the leather is rinsed with water.

Immediately following this, the leather is subjected to the actual treatment in a fresh bath containing 0.1 to 10 and preferably 0.5 to 5 per cent by weight of the filling agent usable according to the invention and made from homo- or copolymeric acrylic acids and protein glue. The leather is treated, for example, with a ratio of leather moist from shaving to liquor of approximately 1:0.2 to 1:3 in the drum and approximately 1:2.5 to 1:5 in the paddle and at a bath temperature of 20° to 50°C, particularly 30°C, for 30 to 90 minutes. If desired, the thus treated leather can be subsequently rinsed. Any subsequent fat-liquoring and/or dyeing of the leather is advantageously carried out in a fresh bath in the usual manner.

In the following Examples the temperatures are given in degrees Centigrade.

EXAMPLE 1

100 g of chrome-tanned, shaved full grain side leather are neutralised in a drum (ratio of shaved leather : water = 1:2) in a known manner to the extent that the pH-value of the leather through the cross-section remains below 4, and barely exceeds 5 only at the surface of the leather. To the bath are then added 5 g of the filling agent described below and the neutralised leather is treated at a bath temperature of 30° for 30 minutes. The leather is then fat-liquored, in the same bath or in a fresh bath, in a manner known per se using conventional fat-liquoring agents.

Leather is obtained having good fullness with a compact fine grain and which can be easily dyed to give dyeings having excellent fastness to light.

The filling agent used in the above Example is obtained as follows:

172 ml of water, 8.5 g of methacrylic acid and 8.5 g of acrylic acid amide are mixed at 20°, the reaction mixture is heated to 80°, 0.4 g of potassium persulphate are added and the reaction mixture is maintained, whilst being stirred, for 5 hours at 80 to 82°, whereupon the obtained slightly milky solution is cooled to 50° and 5 g of 50% aqueous sodium hydroxide solution are added. To the clear solution are subsequently added 190 g of aqueous protein glue solution (42%). In this manner a readily flowable, directly usable, light brown composition is obtained.

By using, instead of 8.5 g of acrylic acid amide, equivalent amounts of methacrylic acid amide, N-hydroxymethyl- or N-β-hydroxyethyl-acrylic acid amide, with otherwise the same procedure, similar compositions are obtained.

EXAMPLE 2

100 g of chrome-tanned, shaved full grain side leather are neutralised to the extent that the leather has approximately a pH-value of 5 throughout. The leather is subsequently rinsed and treated, in a drum, in a fresh bath, consisting of 100 ml of water and 2.5 g of the filling agent described below, for 20 minutes at 25°, whereupon 5 g of a liquid condensation product of phenol sulphonic acid, formaldehyde and urea (ratio 1:1:0.5) are added to the bath, and the treatment then proceeds for one hour at 25°.

After fat-liquoring, a leather with very good fullness, firm handle and tight grain is obtained.

The filling agent, used in the above Example, is obtained as follows:

500 ml of water, 68.8 g of methacrylic acid and 17.2 g of crotonic acid are dissolved at room temperature in a 1-liter three-necked flask, and to the solution is added 1 g of dibenzoyl peroxide. The obtained mixture is subsequently heated within 2 hours to 85° and, whilst being stirred, maintained for 3 hours at this temperature. After dilution with 200 ml of water, the pH-value of the obtained solution is adjusted with 30% aqueous sodium hydroxide solution to 7, and to the solution are then added at 60°, with thorough stirring, 615 g of aqueous protein glue solution (42%).

EXAMPLE 3

100 g of chrome-tanned, shaved kid leather are neutralised to the extent that the pH-value of the leather is between 4.5 and 4.8 throughout. The leather is then given a short washing and afterwards treated, in a drum, in a fresh liquor (50 ml of water) at a temperature of 35° with 2 g of the filling agent described below. To the bath are added, after 30 minutes, 10 g of a liquid condensation product from formaldehyde, dihydroxydiphenyl sulphone and naphthalene sulphonic acid (ratio 0.75:1:1) (pH-value of the liquor about 4), and the treatment is continued at the same temperature for one hour.

In this manner leather is obtained having very good fastness to light and which, after the usual dyeing and fat-liquoring, has good fullness with a firm handle and a fine smooth grain.

The filling agent, used in the above Example, is produced as follows:

700 ml of water, 64.8 g of acrylic acid and 7 g of croton aldehyde are mixed in a 1-liter flask with stirrer at room temperature and to the reaction mixture are added 2 g of potassium persulphate and the whole is heated over 30 minutes to 80° and maintained, whilst being stirred, for 5 hours at this temperature. The reaction solutiton is subsequently cooled to 50°, adjusted to a pH-value of 6.5 using 8-N-sodium hydroxide solution, and to the reaction solution are then added 510 g of aqueous protein glue solution (42%).

EXAMPLE 4

100 g of chrome-tanned sheepskin leather wet-buffed on the stone are rinsed and treated, in a drum, in 100 ml of water at room temperature and with a pH-value of the leather of below 4 throughout, with 2 g of a 50% glutaraldehyde solution. After 30 minutes, the pH-value throughout of the leather is increased to approximately 5 by the addition of sodium bicarbonate solution. After a further 30 minutes, 5 g of the filling agent described below are added to the bath and the leather is fulled in the liquor for one hour. 1 ml of 85% formic acid is subsequently added and the treatment is continued during 10 minutes with a pH-value of between 4 and 5.

After the usual slight fat-liquoring, the leather is dried and subsequently buffed. It can afterwards be wetted back and dyed in a known manner. A suede leather for clothing is obtained having excellent properties with regard to buffing dyeability, fastness to water and fastness fo light.

The filling agent, used in the above Example, is obtained as follows:

a. 300 ml of water, 21.8 g of methacrylic acid and 18.2 g of acrylic acid are mixed at 25° in a 1-liter three-necked flask. The obtained mixture is then heated within 30 minutes to 85° and 1 g of potassium persulphate is added. A slightly exothermic reaction occurs and the temperature rises within 10 minutes to 91°. The solution is subsequently further stirred for 2 hours at 85°. After cooling of the reaction solution to 50°, it is adjusted with aqueous 50% sodium hydroxide solution to a pH-value of 6, and 95 g of an aqueous protein glue solution (21%) are added. After 20 minutes stirring, a viscous, homogeneous, light brown solution is obtained which is directly usable.

b. If, instead of 21.8 g of methacrylic acid, double the amount of methacrylic acid is used in the process decribed under (a), then a composition is obtained which imparts to leather similar properties.

c. If the 18.2 g of acrylic acid are replaced by equivalent amounts of α-ethyl- or α-isopropyl-acrylic acid in the process described under (a), then compositions are obtained which are just as suitable for the filling of chrome-leather.

EXAMPLE 5

100 g of chrome-tanned sheepskin leather wet-buffed on the stone are weakly neutralised and rinsed. The leather is subsequently fulled at 40° for 30 minutes, in a drum, in a liquor of 100 ml of water containing 5 g of the composition described below, whereupon 5 g of mimosa extract and 5 g of a solid condensation product from formaldehyde, urea, phenol and phenol sulphonic acid (ratio 0.75:1.5:0.5:1) are added. After two hours drumming, a short rinsing is given, whereupon the leather is fat-liquored and crusted in a usual manner. After subsequent buffing, the thus treated leather can be wetted back and dyed in the usual manner. Leathers are obtained having an excellent fullness and a particularly good compactness of the leather structure.

The aqueous composition used in the above Example is produced as follows:

856 ml of water and 86 g of methacrylic acid are mixed at room temperature in a 2½-liter three-necked flask provided with reflux condenser, thermometer and stirrer. With thorough stirring, 1 g of potassium persulphate is then added and the contents of the flask are heated within 30 minutes to 80°. This temperature is maintained for 5 hours, whereby the solution becomes inhomogeneous. After cooling to 50°, 25 g of 50% aqueous sodium hydroxide solution are added to the clear transparent reaction solution, whereupon 935 g of a 42% aqueous protein glue solution are added whilst the solution is being well stirred. Stirring is continued for a further half hour. A light-brown-coloured composition is obtained which is just flowable.

A composition having similar properties is obtained if, in the above Example, the 86 g of methacrylic acid are replaced by the same amount of α-chloroacrylic acid, with otherwise the same procedure.

EXAMPLE 6

100 g of vegetable pre-tanned, crusted sheepskin or kid leather are soaked in water and then treated, in a drum, in 600 ml of water containing 15 g of the composition described below, for 2 hours at room temperature. A leather is obtained having outstanding fullness and compactness and which is distinguished by a good handle and good firmness.

The thus treated leather can be dyed and fat-liquored in the usual manner.

The composition used in the above Example is produced as follows:

150 ml of water and 20 g of acrylic acid are mixed at room temperature in a three-necked flask of 500 ml capacity. After heating the mixture to 85°, 0.5 g of potassium persulphate are added. A slightly exothermic reaction occurs and the temperature of the reaction mixture rises to 97°. Stirring is then continued for 3 hours at 85°. After cooling to 60°, the solution is neutralised with 12.5 g of 50% aqueous sodium hydroxide solution, whereupon 473 g of 42% aqueous protein glue solution are added, with vigorous stirring, to the solution. A viscous composition is obtained.

If, in the above process, instead of 20 g of acrylic acid, the equivalent amount of α-butylacrylic acid is used, a similar composition is obtained.

EXAMPLE 7

100 g of chrome-tanned, shaved full grain side leather are neutralised in a known manner in a drum (ratio of shaved leather to water = 1:3) to the extent that the pH-value of the leather remains below 4 through the section and barely exceeds 5 only at the surface of the leather. To the bath are then added 3 g of the composition described below, and the neutralised leather is treated for 30 minutes at a bath temperature of 30°. The leather can be subsequently fat-liquored in the usual manner, either in the same bath of in a fresh bath.

Leather is obtained having good fullness, a compact fine grain, good dyeability and excellent fastness to light.

The composition used in the above Example is obtained as follows:

156 ml of water and 1.4 g of potassium sulphate are heated to 95° within 15 minutes in a flask fitted with stirrer. With thorough stirring, a mixture of 29 g of methacrylic acid and 14 g of acrylic acid ethyl ester is added dropwise within 20 minutes, whereby the formed polymerisate gradually precipitates in the form of a soft wax. Stirring is continued for one hour at 95°, 270 ml of water are added for dilution and the whole is neutralised with 32 g of 50% aqueous sodium hydroxide solution, whereby, after a short time, a clear solution is obtained. To this are finally added, with vigorous stirring, 480 g of 42% aqueous protein glue solution.

If in the above process, the 14 g of acrylic acid ethyl ester are replaced by equivalent amounts of acrylic acid methyl ester or acrylic acid-β-hydroxyethyl ester, with otherwise the same procedure, then compositions are obtained which are likewise very suitable for the filling of chrome-tanned side leather.

EXAMPLE 8

100 g of chrome-tanned, shaved kid leather are neutralised to the extent that the pH-value of the leather throughout is between 4.5 and 4.8. The leather is given a short washing and is then treated, in a drum, in 100 ml of water containing 8 g of the filling agent described below, at a temperature of 30°. To the bath are added, after 30 minutes, 5 g of a liquid condensation product of formaldehyde, dihydroxydiphenyl sulphone and naphthalene sulphonic acid (ratio 0.75:1:1)(pH-value of the liquor about 4), and the treatment is continued at the same temperature for one hour.

In this manner leather having very good fastness to light is obtained and which possesses, after the usual dyeing and fat-liquoring, good fullness with a firm handle and a fine smooth grain.

The filling agent used in the above Example is produced as follows:

30 g of acrylic acid and 10 g of acrylic acid butyl ester are dissolved at room temperature in a mixture of 70 ml of methanol and 30 ml of water. 0.3 g of potassium persulphate are then added and the mixture is heated within one hour to 60°. This temperature is maintained for 2 hours and the mixture is then diluted with 160 ml of water and the pH-value adjusted to 7 with 30% aqueous hydroxide solution. By the addition of 96 g of a 42% aqueous protein glue solution a light brown, readily flowable composition is obtained.

EXAMPLE 9

100 g of chrome-tanned, shaved full grain side leather are neutralised to the extent that the leather has a pH-value throughout of about 5. The leather is subsequently rinsed and treated for 20 minutes at 25°, in a drum, in a fresh bath consisting of 70 ml of water, containing 8 g of the filling agent described below, whereupon 1 ml of 85% formic acid is added to the bath, and the treatment is then continued for one hour at 25°.

After fat-liquoring, a leather with very good fullness, firm handle and tight grain is obtained.

The filling agent used in the above Example is obtained as follows:

8 g of acrylic acid and 32 g of acrylic acid ethyl ester are dissolved at 25° in a mixture of 70 ml of methanol and 30 ml of water. To this solution are added 0.25 g of sodium persulphate and the solution is heated within 30 minutes to 60°. A slightly exothermic reaction occurs at this temperature. After subsidence of the reaction, stirring is continued for a further hour at 70°. 240 ml of water are added for dilution and the whole is neutralised with 13 g of 30% aqueous sodium hydroxide solution. 96 g of a 42% aqueous protein glue solution are subsequently added, whereupon a readily flowable yellowish-brown composition is obtained.

EXAMPLE 10

100 g of chrome-tanned sheepskin leather wet-buffed on the stone are rinsed and then treated, in a drum, in 100 ml of water at room temperature and with a pH-value of the leather of below 4 throughout, with 2 g of a 50% glutaraldehyde solution. After 30 minutes, the pH-value of the leather throughout is adjusted to about 5 by the addition of sodium carbonate solution. After a further 30 minutes, 6 g of the filling agent described below are added, and the leather is then fulled in the liquor for one hour. 1 ml of 85% formic acid is subsequently added and the treatment is continued for 10 minutes with a pH-value of between 4 and 5.

After the usual slight fat-liquoring, the leather is dried and subsequently buffed. It can afterwards be wetted-back and dyed in the known manner. A suede leather for clothing is obtained having excellent properties with regard to buffing, dyeability, fastness to water and fastness to light.

The filling agent used in the above Example is obtained as follows:

250 ml of toluene, 35 g of methacrylic acid, 5 g of styrene and 0.5 g of dibenzoyl peroxide are mixed together in a 500 ml three-necked flask fitted with reflux condenser and stirrer, at room temperature. After heating the mixture to 90°, an exothermic reaction occurs, and the internal temperature rises to 116°. This temperature is maintained for one hour and afterwards stirring is continued for a further 6 hours at 100°. The polymerisation product obtained in this manner is in the form of a white powder which is isolated by filtration and dried in vacuo. 20 g of the thus obtained copolymer are dissolved in 200 ml of water, the solution is adjusted with 33% aqueous sodium hydroxide solution to a pH-value of 5.5 and then mixed with 380 g of a 21% aqueous protein glue solution.

If in the above described process, instead of 5 g of styrene, equivalent amounts of methylstyrene or p-chlorostyrene are used, with otherwise the same procedure, then compositions are obtained which are likewise very suitable for the filling of sheepskin leather.

EXAMPLE 11

100 g of vegetable pre-tanned, crusted sheepskin or kid leather are soaked in water and then treated, in a drum, in 800 ml of water containing 10 g of the composition described below, for 2 hours at room temperature. A leather is obtained having very good fullness and compactness, and which is also distinguished by a good handle and good firmness.

The thus treated leather can be subsequently dyed and fat-liquored in the usual manner.

The composition used in the above Example is obtained as follows:

24 g of acrylic acid and 16 g of vinyl acetate are dissolved at 20° in a mixture of 60 ml of methyl alcohol and 40 ml of water. 0.25 g of potassium persulphate are then added and the solution is heated within 20 minutes to 60°. A slightly exothermic reaction occurs. After completion of the polymerisation, the reaction solution is stirred for a further 3 hours at 65°. To produce the directyl usable composition, the reaction solution is afterwards diluted with 200 ml of water, the solution adjusted with 30% aqueous sodium hydroxide solution to pH 7 and, with vigorous stirring, mixed with 200 g of a 42% aqueous protein glue solution.

EXAMPLE 12

100 g of chrome-tanned sheepskin leather wet-buffed on the stone are weakly neutralised and rinsed. The leather is subsequently fulled for 30 minutes, in a drum, in a liquor consisting of 80 ml of water at 35° containing 15 g of the composition described below, whereupon there are added three times, at intervals of 30 minutes, 0.5 ml each time of 85% formic acid. 30 minutes after the last addition of acid, the leather is given a short rinsing and subsequently fat-liquored and crusted in the usual manner. After subsequent buffing, the thus treated leather can be wetted-back and dyed as usual. Leather is obtained having very good fullness and a very compact leather structure.

The composition used in the above Example is produced as follows:

200 ml of water and 5 g of an ethoxylated lauryl alcohol sulfate having about 20 ethyleneoxy groups are placed in a 1-liter flask with stirrer and heated within 30 minutes to 90°. From one supply vessel, within 3 hours at 90°, a mixture of 140 g of methacrylic acid and 10 g of the vinyl ester known under the trade-name of Veova 911 (vinyl ester of tertiary carboxylic acids having 9 to 11 carbon atoms) is evenly added, whilst from a second supply vessel is introduced, at the same temperature, a solution of 7.5 g of potassium persulphate in 150 ml of water. After completion of the dropwise addition, the reaction solution is stirred for a further hour at 90°. To the obtained milky viscous reaction solution are then added 80 g of 30% aqueous sodium hydroxide solution and the whole is thereupon mixed at 50° with 500 g of a 21% aqueous protein glue solution and 150 ml of water.

EXAMPLE 13

100 g of chrome-tanned, shaved full grain side leather are neutralised in a known manner in a drum (ratio of shaved leather to water = 1:3) to the extent that the pH-value of the leather through the section remains below 4 and barely exceeds 5 only at the surface of the leather. To the bath are then added 5 g of the composition described in Example 5 and the neutralised leather is treated at a bath temperature of 30° for 30 minutes. The leather is dyed at 60° for 30 minutes in a fresh liquor (ratio of shaved leather to liquor = 1:3) containing 1 g of the dyestuff of the formula

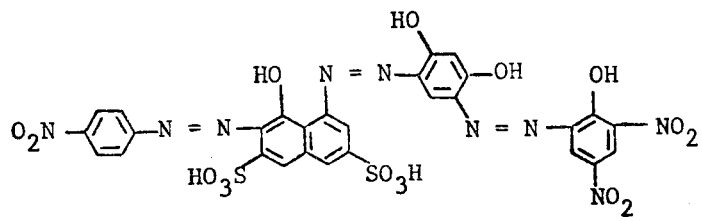

To the exhausted dye bath are added 3 g of sulphated animal foot oil and the leather is fat-liquored for 45 minutes at 60°.

A leather is obtained having good fullness, a compact fine grain and giving a level and intense brown dyeing with good fastness to light.

EXAMPLE 14

100 g of chrome-tanned, shaved full grain side leather are treated in the drum at 30° during 10 minutes in a liquor consisting of 100 ml of water and 0.5 g of sodium bicarbonate. Then 5 g of the filling agent described below and an aqueous solution of 2 g of a condensation product from formaldehyde, dihydroxydiphenyl sulphone and naphthalene sulphonic acid (ratio 0.75:1:1), adjusted to a pH-value of 3.3, are added to the liquor and the treatment is continued at the same temperature for 30 minutes.

After the usual fat-liquoring leather with good fullness and a good grain quality is obtained.

The filling agent used in the above Example is obtained as follows:

170 ml of water, 3 g of methacrylic acid 14 g of styrene and 2 g of the sodium salt of stearylsulphate are heated within 30 minutes to 80°. Then 0.3 g of potassium persulphate are added to the obtained emulsion whereby a slightly exothermic reaction occurs and the temperature rises to 87°. This temperature is maintained for 2 hours. For the preparation of the directly usable composition the resulting slightly milky reaction solution is admixed with 4 g of 30% aqueous sodium hydroxide solution and then at 50° with 285 g of an aqueous protein glue solution (28%).

EXAMPLE 15

100 g of vegetable pre-tanned, crusted kid leather are soaked in water and then treated in a drum in 600 ml of water. 6 g of the pulverised, dry filling agent described below are added to the treatment liquor, and the leather is treated for 2 hours at room temperature. After the usual dyeing and fat-liquoring leather is obtained which is distinguished by excellent fullness, compactness and good handle.

The pulverised filling agent used in the above Example is produced as follows:

258 ml of water, 20 g of methacrylic acid and 5 g of acrylic acid are mixed at room temperature in a three-necked flask of 500 ml. After heating the mixture to 80°, 0.5 g of ammonium persulphate are added. A slightly exothermic reaction occurs and the temperature rises to 89°. This temperature is maintained for 5 hours, then the solution obtained is cooled to 50° and neutralised with 7.5 g of 50% aqueous sodium hydroxide solution. Finally, with vigorous stirring, 288 g of an aqueous protein glue solution (42%) are added and the mixture obtained is evaporated to dryness in vacuo and pulverised.

EXAMPLE 16

100 g of chrome-tanned, shaved kid leather are neutralised to the extent that the pH-value of the leather throughout is between 4.5 and 4.8. The leather is given a short rinsing and then treated for 90 minutes at 30° in the drum, in a fresh liquor (60 ml of water) containing 5 g of the pulverised filling agent described below.

In this manner leather is obtained which has very good fastness to light and which, after the usual dyeing and fat-liquoring, possesses good fullness with a firm handle and a fine smooth grain.

The pulverised filling agent used in the above Example is prepared as follows:

430 ml of water and 43 g of methacrylic acid are mixed at room temperature in a 2½-liter flask fitted with a stirrer. Then the mixture is heated within 30 minutes to 75° and 0.15 g of potassium persulphate are added. A slightly exothermic reaction occurs, the solution becoming inhomogeneous. Stirring is then continued for 3 hours at 75°. After cooling to 45° the clear transparent reaction solution is admixed with 42 g of 30% aqueous sodium hydroxide solution. Thereafter, 400 g of a 50° warm, 50% aqueous protein glue solution are added with vigorous stirring and stirring is continued for another 30 minutes. To the resulting viscous solution 950 g of a 40% aqueous solution of a condensation product from formaldehyde, urea, phenol and phenol sulphonic acid (ratio 0.75:1.5:0.5:1), neutralised with ammonia to a pH of 5.5, are added at 50°. The obtained mixture is then evaporated to dryness at 90° and pulverised.

EXAMPLE 17

100 g of chrome-tanned, shaved full grain side leather are neutralised in the drum to the extent that the leather has a pH-value throughout of below 4. The leather is given a short washing and then treated for 1 hour at 35° in a fresh liquor (200 ml of water) containing 4 g of the pulverised filling agent described below. The leather thus treated can be dyed and fat-liquored in the usual manner, thereby obtaining a leather with good fullness, a compact fine grain and excellent fastness to light.

The pulverised filling agent used in the above Example can be obtained as follows:

400 ml of water, 32.7 g of methacrylic acid and 27.3 g of acrylic acid and mixed at room temperature in a 1-liter three-necked flask. The obtained mixture is then heated to 80° during 45 minutes and 1.0 of potassium persulphate is added. A slightly exothermic reaction occurs and the temperature rises to 87°. Then the reaction solution is stirred for 2 hours at 85° and, after cooling to 40°, neutralised with 40 g of 50% aqueous sodium hydroxide solution and finally admixed with 142 g of an aqueous protein glue solution (42%). After stirring for 30 minutes 270 g of a 45% aqueous solution of a condensation product from formaldehyde, dihydroxydiphenylsulphone and naphthalene sulphonic acid (ratio 0.75:1:1), adjusted to a pH of 6.0, are added, and the resulting composition is evaporated to dryness in vacuo at 80°–85° and pulverised.

EXAMPLE 18

100 g of chrome-tanned sheepskin leather wet-buffed on the stone are weakly neutralised and rinsed. The leather is subsequently fulled for 30 minutes at 35° in the drum, in a liquor consisting of 100 ml of water and 12 g of the composition described below, whereupon there are added three times, at intervals of 30 minutes, 0.5 ml each time of 85% formic acid. 30 minutes after the last addition of acid, the leather is given a short rinsing and subsequently fat-liquored and crusted in the usual manner. After subsequent buffing, the thus treated leather can be wetted back and dyed as usual. Leather is obtained having good fullness and a very compact leather structure.

The composition used in the above Example is prepared as follows:

856 ml of water and 86 g of methacrylic acid are mixed at room temperature in a 4-liter three-necked flask. The contents of the flask are then heated to 75° within 30 minutes with vigorous stirring and 1.5 g of ammonium persulphate are added. A slightly exothermic reaction occurs, the mixture being kept for 4 hours at 75°. After cooling to 50°, the obtained clear reaction solution is admixed, with vigorous stirring with 960 g of a 42% aqueous protein glue solution which has been adjusted to a pH-value of 9.0 by the addition of sodium hydroxide solution. The resulting mixture is poured into a 4-liter beaker and 950 g of a 40% aqueous solution of a condensation product from formaldehyde, urea, phenol and phenol sulphonic acid (ratio 0.75:1.5:0.5:1), adjusted to a pH of 6.0 with sodium hydroxide solution, are added. A milky homogeneous composition is obtained which yields a clear solution when diluted with water.

We claim:

1. In a process for the filling of leather tanned with mineral, vegetable and/or synthetic tanning agents, the improvement which consists of treating the leather in the acid pH-range, with an aqueous solution of a filling agent consisting of
   a. a homopolymer or copolymer selected from the group consisting of acrylic acid, methacrylic acid, α-ethylacrylic acid, α-isopropylacrylic acid, α-butylacrylic acid and α-chloroacrylic acid or
   b. copolymers formed from a monomer of component (a) as defined above and a vinyl unsaturated monomer selected from the groups consisting of
      α. water-soluble comonomers containing carboxylic acid groups, carboxylic acid amide groups and their N-hydroxyalkyl derivatives, water-soluble derivatives of β-hydroxyalkyl acrylic or methacrylic acid amides, or aldehydes capable of copolymerisation; and
      β. water-insoluble comonomers consisting of optionally substituted acrylic or methacrylic acid alkyl esters having from 1 to 12 carbon atoms in the alkyl radical; vinyl esters of aliphatic carboxylic acids, containing from 1 to 12 carbon atoms, or mixtures of such carboxylic acids; or vinyl benzenes; and
   c. protein glue in a weight ratio of polymer to glue of from 1:12 to 12:1,
   alone or in admixture with further additives.

2. A process as claimed in claim 1 wherein the unsubstituted or substituted home- or copolymeric acrylic acid is in the form of an alkali metal salt or ammonium salt, alone or in admixture with corresponding free polycarboxylic acids.

3. A process as claimed in claim 1 wherein component (a) is a water-soluble homopolymer of acrylic acid or methacrylic acid.

4. A process as claimed in claim 1 wherein the polymer and the protein glue are used in a reciprocal weight ratio of from 1:1 to 1:6.

5. A process as claimed in claim 1 wherein the further additives are tanning agents.

6. A composition used as agent for the filling of leather tanned with mineral, vegetable and/or synthetic tanning agents essentially consisting of
   a. a homopolymer or copolymer selected from the group consisting of acrylic acid, methacrylic acid, α-ethylacrylic acid, α-isopropylacrylic acid, α-butylacrylic acid and α-chloroacrylic acid, or
   b. copolymers formed from a monomer of component (a) as defined above and a vinyl unsaturated monomer selected from the groups consisting of
      α. water-soluble comonomers containing carboxylic acid groups, carboxylic acid amide groups and their N-hydroxyalkyl derivatives, water-soluble derivatives of β-hydroxyalkyl acrylic or methacrylic acid amides, or aldehydes capable of copolymerisation; and
      β. water-insoluble comonomers consisting of optionally substituted acrylic or methacrylic acid alkyl esters having from 1 to 12 carbon atoms in the alkyl radical; vinyl esters of aliphatic carboxylic acids, containing from 1 to 12 carbon atoms, or mixtures of such carboxylic acids; or vinyl benzenes; and
   c. protein glue in a weight ratio of polymer to glue of from 1:12 to 12:1,
   alone or in admixture with further additives.

7. A composition according to claim 6, wherein said composition is a concentrated, liquid, water-soluble composition which, calculated on the total weight of the composition contains as essential ingredients
   1. from 5 to 40% by weight of filling agent consisting of components (a) and/or (b) and (c) as defined in Claim 6, in a weight ratio of said components (a) and/or (b) to (c) of from 1:12 to 12:1;
   2. from 0 to 30% by weight of tanning agent;
   the balance consisting of
   3. water,
   whereby the composition has a pH from 4.0 to 7.0.

8. A composition according to claim 6, wherein said composition is in dry form.

9. A composition as claimed in claim 6, wherein the further additives are tanning agents.

* * * * *